(12) United States Patent
Gold et al.

(10) Patent No.: US 8,769,478 B2
(45) Date of Patent: Jul. 1, 2014

(54) AGGREGATION OF MULTIPLE HEADLESS COMPUTER ENTITIES INTO A SINGLE COMPUTER ENTITY GROUP

(75) Inventors: Stephen Gold, Winterbourne Down (GB); Peter Thomas Camble, Bishopston (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1458 days.

(21) Appl. No.: 11/111,866

(22) Filed: Apr. 22, 2005

(65) Prior Publication Data

US 2005/0193080 A1 Sep. 1, 2005

Related U.S. Application Data

(62) Division of application No. 09/800,100, filed on Mar. 7, 2001, now abandoned.

(51) Int. Cl.
*G06F 9/44* (2006.01)

(52) U.S. Cl.
USPC ........................................................ 717/101

(58) Field of Classification Search
USPC ......... 717/100, 120, 121, 170–173, 176–178; 709/200–222, 246, 248
See application file for complete search history.

(56) References Cited

U.S. PATENT DOCUMENTS

| | | | |
|---|---|---|---|
| 5,590,284 A * | 12/1996 | Crosetto | 712/29 |
| 5,602,754 A | 2/1997 | Beatty et al. | |
| 5,615,127 A | 3/1997 | Beatty et al. | |
| 6,026,438 A * | 2/2000 | Piazza et al. | 709/221 |
| 6,195,687 B1 * | 2/2001 | Greaves et al. | 709/208 |
| 6,324,692 B1 * | 11/2001 | Fiske | 717/171 |
| 6,594,757 B1 * | 7/2003 | Martinez | 713/2 |
| 6,658,498 B1 | 12/2003 | Carney et al. | |
| 6,732,165 B1 * | 5/2004 | Jennings, III | 709/220 |
| 6,735,206 B1 * | 5/2004 | Oki et al. | 370/395.32 |
| 6,895,499 B1 * | 5/2005 | Frazier | 713/1 |
| 7,103,650 B1 * | 9/2006 | Vetrivelkumaran et al. | 709/221 |
| 2002/0133573 A1 | 9/2002 | Matsuda et al. | |
| 2003/0120955 A1 * | 6/2003 | Bartal et al. | 713/201 |
| 2003/0200251 A1 | 10/2003 | Krum | |
| 2004/0015942 A1 * | 1/2004 | Branson et al. | 717/168 |

FOREIGN PATENT DOCUMENTS

WO WO 99/48010 9/1999

* cited by examiner

*Primary Examiner* — Anna Deng

(57) ABSTRACT

A group of headless computer entities is formed via a local area network connection by means of an aggregation service application, operated on a headless computer entity selected as a master entity, which propagates configuration settings for time zone, application settings, security settings and the like across individual slave computer entities within the group. A human operator can change configuration settings globally at group level via a user interface display on a conventional computer having a user console, which interacts with the master headless computer entity via a web administration interface. Addition and subtraction of computer entities from a group are handled by an aggregation service application, and interlocks and error checking is applied throughout the group to ensure that no changes to a slave computer entity are made, unless those changes conform to global configuration settings enforced by the master headless computer entity.

12 Claims, 15 Drawing Sheets

AGGREGATION OF MULTIPLE HEADLESS COMPUTER ENTITIES INTO A SINGLE COMPUTER ENTITY GROUP

RELATED APPLICATIONS

The present application is based on, and claims priority from, application Ser. No. 09/800,100, filed Mar. 7, 2001, the disclosure of which is hereby incorporated by reference herein in its entirety.

FIELD OF THE INVENTION

The present invention relates to the field of computers, and particularly although not exclusively to the connection of a plurality of headless computer entities.

BACKGROUND TO THE INVENTION

It is know to aggregate a plurality of conventional computer entities, each comprising a processor, a memory, a data storage device, and a user console comprising a video monitor, keyboard and pointing device, e.g. mouse, to create a "cluster" in which the plurality of computer entities can be managed as a single unit, and can be viewed as a single data processing facility. In the conventional cluster arrangement, the computers are linked by high-speed data interfaces, so that the plurality of computer entities share an operating system and one or more application programs. This allows scalability of data processing capacity compared to a single computer entity.

True clustering, where all the processor capacity, memory capacity and hard disk capacity are shared between computer entities requires a high bandwidth link between the plurality of computer entities, which adds extra hardware, and therefore adds extra cost. Also there is an inherent reduction in reliability, compared to a single computer entity, which must then be rectified by adding more complexity to the management of the cluster.

Referring to FIG. 1 herein, there is illustrated schematically a basic architecture of a prior art cluster of computer entities, in which all data storage 100 is centralized, and a plurality of processors 101-109 link together by a high-speed interface 110 operate collectively to provide data processing power to a single application, and accessing the centralized data storage device 100. This arrangement is highly scalable, and more data processing nodes and more data storage capacity can be added.

Problems with the prior art clustering architecture include:
  There is a large amount of traffic passing between the data processing nodes 100-109 in order to allow the plurality of data processor nodes to operate as a single processing unit.
  The architecture is technically difficult to implement, requiring a high-speed bus between data processing nodes, and between the data storage facility.
  Relatively high cost per data processing node.

Another known type of computer entity is a "headless" computer entity, also known as a "headless appliance". Headless computer entities differ from conventional computer entities, in that they do not have a video monitor, keyboard or tactile device e.g. mouse, and therefore do not allow direct human intervention. Headless computer entities have an advantage of relatively lower cost due to the absence of monitor, keyboard and mouse devices, and are conventionally found in applications such as network attached storage devices (NAS).

The problem of how to aggregate a plurality of headless computer entities to achieve scalability, uniformity of configuration and uniformity of data policies across the plurality of headless computer entities remains unsolved in the prior art.

In the case of a plurality of headless computer entities, each having a separate management interface, the setting of any "policy" type of administration is a slow process, since the same policy management changes would need to be made separately to each computer entity. This manual scheme of administering each computer entity separately also introduces the possibility of human error, where one or more headless computer entities may have different policy settings to the rest.

Specific implementations according to the present invention aim to overcome these technical problems with headless computer entities, in order to provide an aggregation of headless computer entities giving a robust, scaleable computing platform, which, to a user acts as a seamless, homogenous computing resource.

SUMMARY OF THE INVENTION

One object of specific implementations of the present invention is to form an aggregation of a plurality of computer entities into a single group, to provide a single point of management.

Another object of specific implementations of the present invention is, having formed an aggregation of computer entities, to provide a single point of agent installation into the aggregation.

Specific implementations according to the present invention create a group of computer entities, which makes multiple computer entities behave like a single logical entity. Consequently, when implementing policy settings across all the plurality of computer entities in a group, an administrator only has to change the settings once at a group level.

A set of API are made available by an aggregation service application, which allow a data management application to create a group of headless computer entities, and add additional headless computer entities to the group. The group of computer entities created is based around a "master/slave" scheme, where a first computer entity used to create the group is specified as a "master" and then additional "slave" computer entities are added to the group. The "master" computer entity in the group is used to store group level configuration settings, which other "slave" computer entities synchronise themselves to. The master computer entity also contains a list of which "slave" computer entities are in it's group. The slave computer entities contain the name and internet protocol address of the master computer entity.

Specific implementations provide a group scheme for connecting a plurality of computer entities, where each computer entity in the group acts as a stand alone computer entity, but where policy settings for the computer entity group can be set in a single operation at group level.

According to a first aspect of the present invention there is provided a method of configuring a plurality of computer entities into a group, in which each said computer entity operates to provide its functionality to the group, each said computer entity comprising:
  at least one data processor;
  a data storage device;
  a network connection for communicating with other said computer entities of the group;
  said method comprising the steps of:

assigning one of said plurality of computer entities to be a master computer entity, from which at least one other said computer entity is configured by said master computer entity;

assigning at least one said computer entity to be a slave computer entity, which applies configuration settings set by said master computer entity;

setting at least one configuration setting to be a same value on each of said computer entities, such that each of said plurality of computer entities is capable of providing an equivalent functionality to a user as each other one of said computer entities of said plurality.

According to a second aspect of the present invention there is provided a method of configuring a plurality of computer entities into a plurality of groups, in which, in each group, a said computer entity operates to provide it's functionality to that group, each said computer entity comprising:

at least one data processor;
at least one data storage device;
a network connection for communicating with other said computer entities in a same group;
said method comprising the steps of:
assigning a said computer entity to be a master computer entity of a corresponding respective group;
assigning at least one other said computer entity to be a slave computer entity within said group;
said master computer entity applying at least one configuration setting to a said corresponding respective slave computer entity in said same group, to set said slave computer entity is to provide an equivalent functionality to a user as said master computer entity.

According to a third aspect of the present invention there is provided a set of components for connecting a group of headless computer entities into a group of computer entities having a common set of configuration settings, said component set comprising:

a master configuration component for converting a first headless computer entity into a master computer entity to control a group of computer entities;

a slave configuration component for controlling a second computer entity to act as a slave computer entity within said group;

wherein said master configuration component comprises a set of converters for converting configuration settings received from a control application into a set of Application Procedure Instruction procedure calls; and said slave configuration application comprises a set of converters for converting received Application Procedure Instructions into a set of configuration settings readable by a client application resident on said slave computer entity.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

The best mode implementation is aimed at achieving scalability of computing power and data storage capacity over a plurality of headless computer entities, but without incurring the technical complexity and higher costs of prior art clustering technology. The specific implementation described herein takes an approach to scalability of connecting together a plurality of headless computer entities and logically grouping them together by a set of common configuration settings.

Features which help to achieve this include:

Applying configuration settings, including for example policies, across all headless computer entities in a group from a single location;

Distributing policies across a plurality of headless computer entities, without the need for human user intervention via a user console.

Various mechanisms and safeguards detailed herein specifically apply to headless computer entities, where changing an application, networking, security or time zone settings on one computer entity must be reflected across an entire group of computer entities. Interlocks are implemented to prevent an administrator from changing any of these settings when it is not possible to inform other computer entities in the group of the change.

Figure 1:
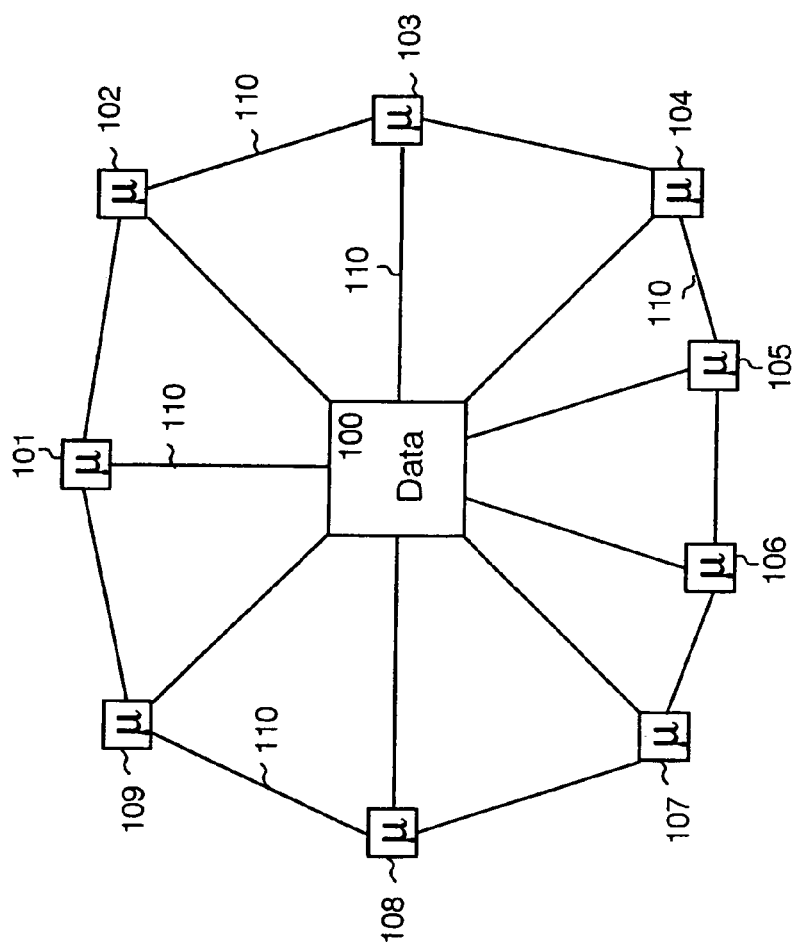
FIG. 1 illustrates schematically a prior art cluster arrangement of conventional computer entities, having user consoles allowing operator access at each of a plurality of data processing nodes.
Figure 2:
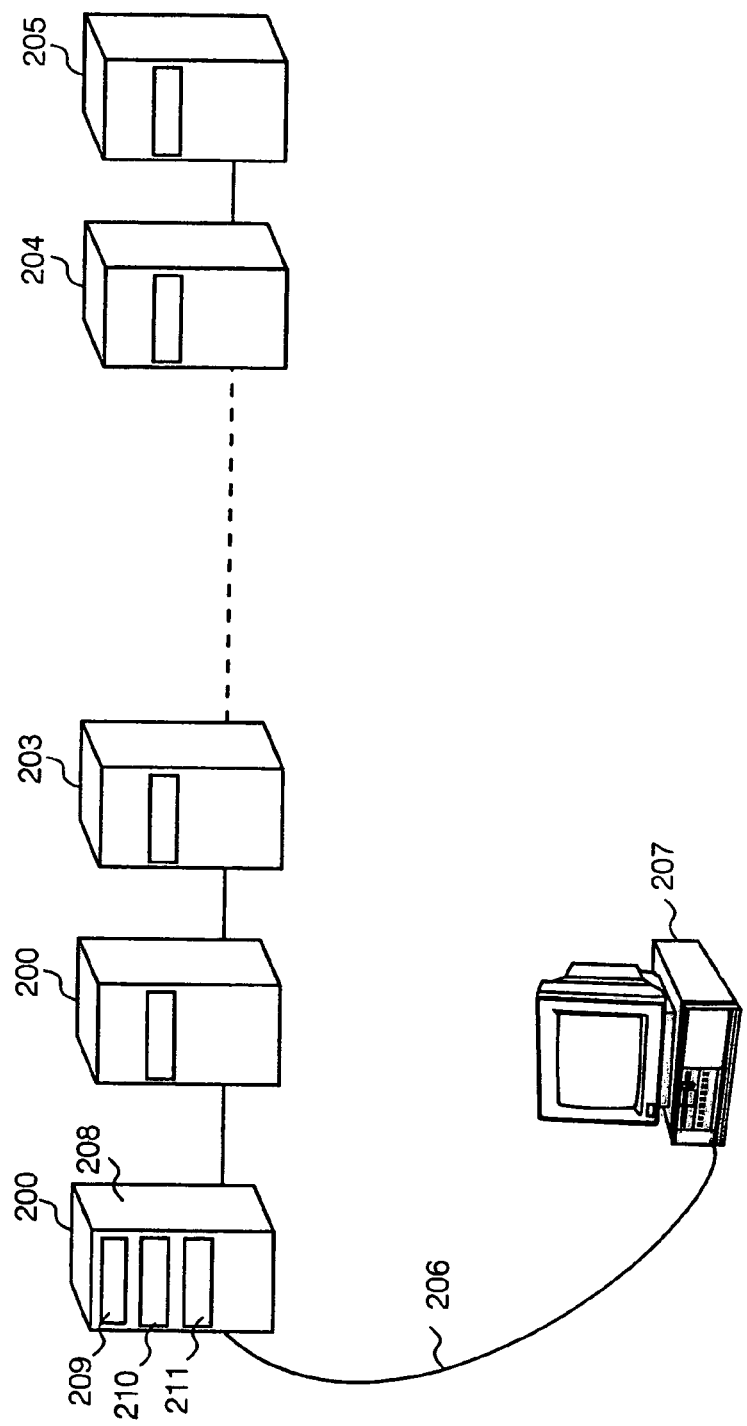
FIG. 2 illustrates schematically a plurality of headless computer entities connected by a local area network, and having a single administrative console computer entity having a user console with video monitor, keyboard and tactile pointing device according to a specific implementation of the present invention.

Referring to FIG. 2 herein, there is illustrated schematically an aggregation group of a plurality of headless computer entities according to a specific embodiment of the present invention. The aggregation comprises a plurality of headless computer entities 200-205 communicating with each other via a communications link, for example a known local area network 206; and a conventional computer entity 207, for example a personal computer or similar, having a user console comprising a video monitor, keyboard and pointing device, e.g. mouse.

Each headless computer entity has its own operating system and applications, and is self maintaining. Each headless computer entity has a web administration interface, which a human administrator can view via a web browser on the user console computer 207. The administrator can set centralized policies from the user console, which are applied across all headless computer entities in a group.

Each headless computer entity may be configured to perform a specific computing task, for example as a network attached storage device (NAS). In general, in the aggregation group, a majority of the headless computer entities will be similarly configured, and provide the basic scalable functionality of the group, so that from a users point of view, using any one of that group of headless computer entities is equivalent to using any other computer entity of that group.

Each of the plurality of headless computer entities are designated either as a "master" computer entity, or a "slave" computer entity. The master computer entity, controls aggregation of all computer entities within the group, and acts a centralized reference, for determining which computer entities are in the group, and for distributing configuration settings including application configuration settings across all computer entities in the group, firstly to set up the group in the first place, and secondly, to maintain the group by monitoring each of the computer entities within the group and their status, and to ensure that all computer entities within the group continue to refer back to the master computer entity, to maintain the settings of those slave computer entities according to a format determined by the master computer entity.

Since setting up and maintenance of the group is at the level of maintaining configuration settings under control of the master computer entity, the group does not form a truly distributed computing platform, since each computer entity within the group effectively operates according to its own operating system and application, rather than in the prior art case of a cluster, where a single application can make use of a plurality of data processors over a plurality of computer entities using high speed data transfer between computer entities.

Figure 3:
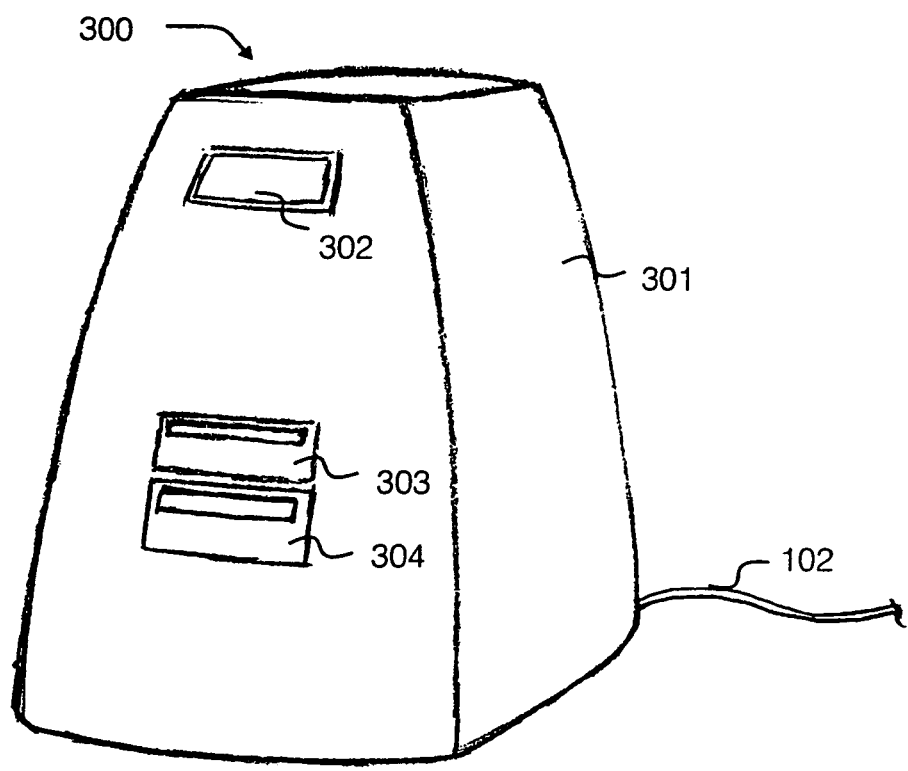
FIG. 3 illustrates schematically in a perspective view, an individual headless computer entity.

Referring to FIG. 3 herein, each headless computer entity 300 comprises a casing 301 containing a processor; memory; data storage device, e.g. hard disk drive; a communications port connectable to a local area network cable; a small display on the casing, for example a liquid crystal display (LCD) 302, giving limited information on the status of the device, for example power on/off or stand-by modes, or other modes of operation. Optionally a CD-ROM drive 303 and optionally a back-up tape storage device 304. Otherwise, the headless computer entity has no physical user interface, and is self-maintaining when in operation. Direct human intervention with the headless computer entity is restricted by the lack of physical user interface. In operation, the headless computer entity is self-managing and self-maintaining.

Figure 4:
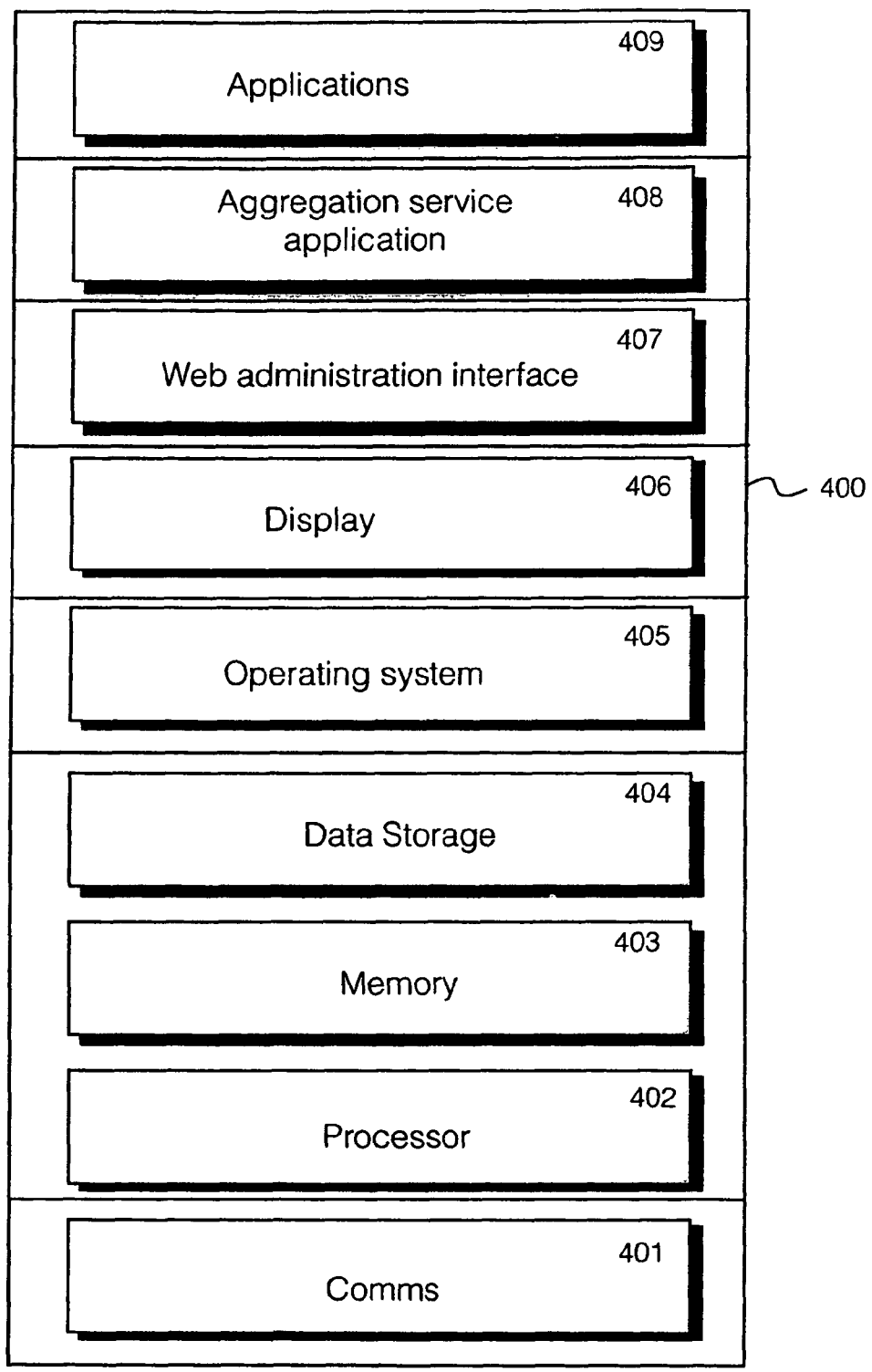
FIG. 4 illustrates schematically physical and logical components of an individual headless computer entity comprising the aggregation of FIG. 2.

Referring to FIG. 4 herein, there is illustrated schematically physical and logical components of a computer entity 400. The computer entity comprises a communications interface 401, for example a local area network card such as an Ethernet card; a data processor 402, for example an Intel® Pentium or similar Processor; a memory 403, a data storage device 404, in the best mode herein an array of individual disk drives in a RAID (redundant array of inexpensive disks) configuration; an operating system 405, for example the known Windows 2000®, Windows95, Windows98, Unix, or Linux operating systems or the like; a display 406, such as an LCD display; a web administration interface 407 by means of which information describing the status of the computer entity can be communicated to a remote display; an aggregation service module 408 in the form of an application, for managing the data storage device within a group environment; and one or a plurality of applications programs 409, capable of being synchronised with other applications on other group member computer entities.

Figure 5:
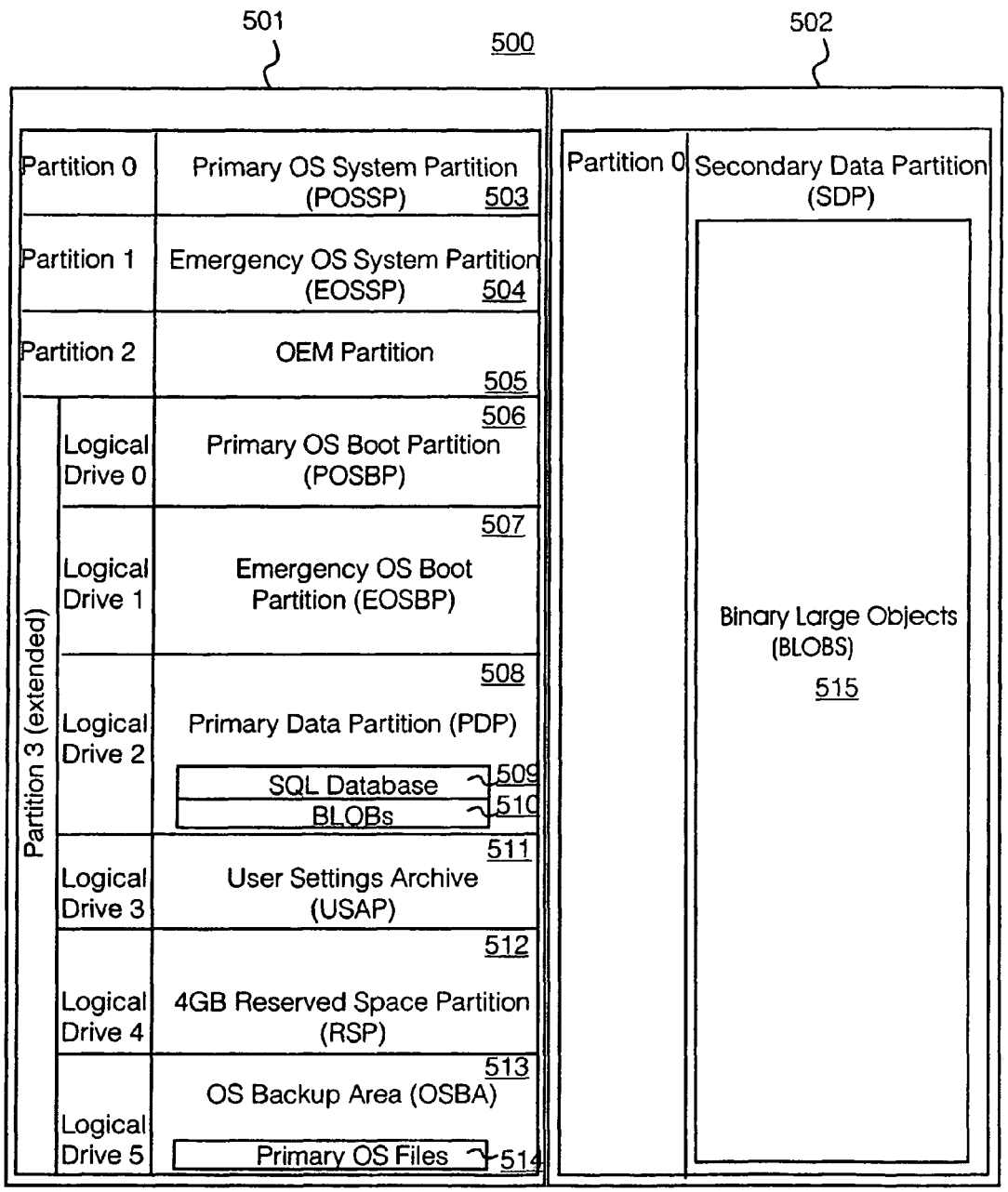
FIG. 5 illustrates schematically a logical partitioning structure of the headless computer entity of FIG. 4.

Referring to FIG. 5 herein, there is illustrated schematically a partition format of a headless computer entity, upon which one or more operating system(s) are stored. Data storage device 400 is partitioned into a logical data storage area which is divided into a plurality of partitions and sub-partitions according to the architecture shown. A main division into a primary partition 501 and a secondary partition 502 is made. Within the primary partition are a plurality of sub partitions including a primary operating system system partition 503 (POSSP), containing a primary operating system of the computer entity; an emergency operating system partition 504 (EOSSP) containing an emergency operating system under which the computer entity operates under conditions where the primary operating system is inactive or is deactivated; an OEM partition 505; a primary operating system boot partition 506 (POSBP), from which the primary operating system is booted or rebooted; an emergency operating system boot partition 507 (EOSBP), from which the emergency operating system is booted; a primary data partition 508 (PDP) containing an SQL database 509, and a plurality of binary large objects 510, (BLOBs); a user settings archive partition 511 (USAP); a reserved space partition 512 (RSP) typically having a capacity of the order of 4 gigabytes or more; and an operating system back up area 513 (OSBA) containing a back up copy of the primary operating system files 514. The secondary data partition 502 comprises a plurality of binary large objects 515.

Figure 6:
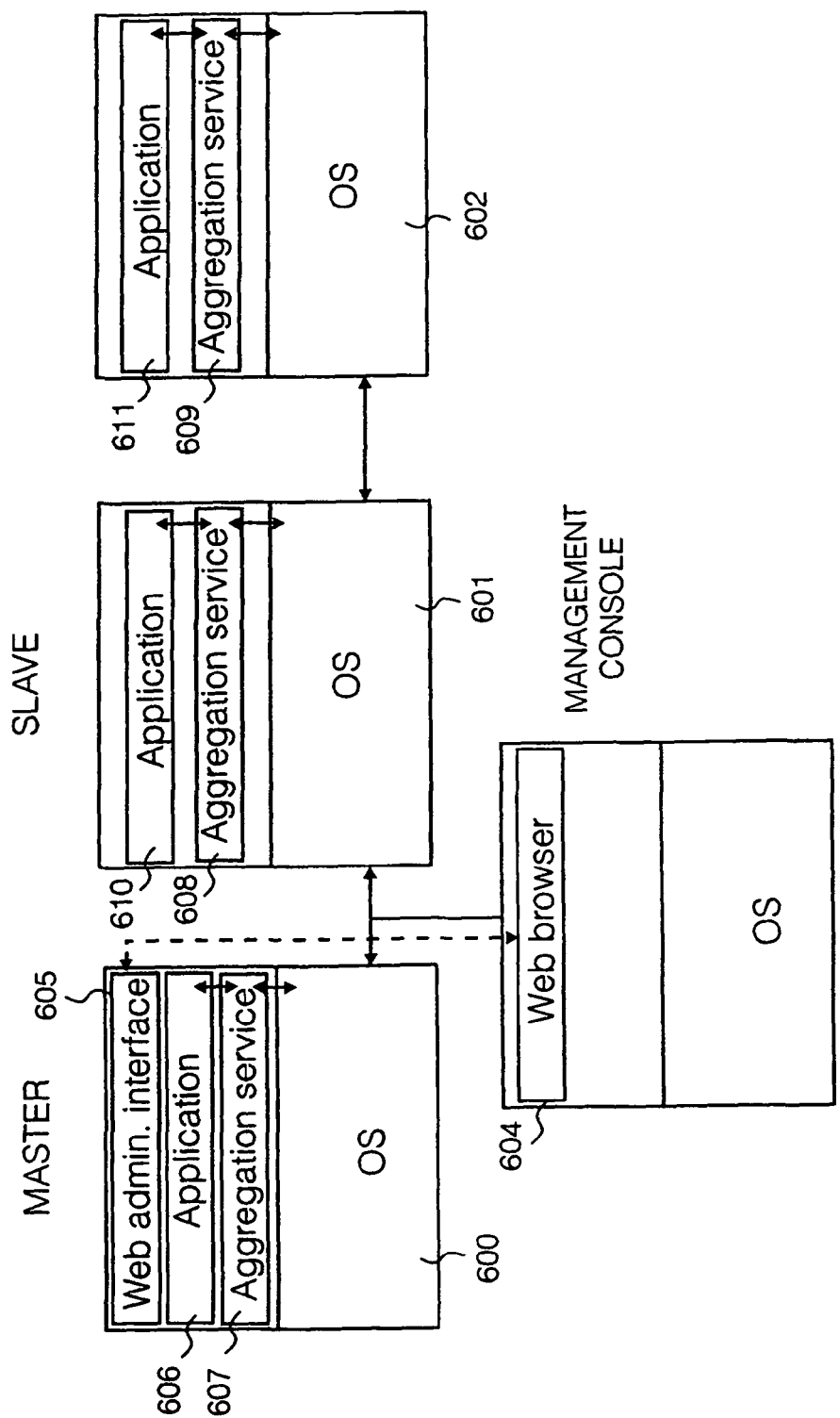
FIG. 6 illustrates schematically how a plurality of headless computer entities are connected together in an aggregation by an aggregation service application according to a specific implementation of the present invention.

Referring to FIG. 6 herein, there is illustrated schematically interaction of a plurality of headless computer entities, and a management console. The management console comprises a web browser 604 which can view a web administration interface 605 on a master headless computer entity. The master headless computer entity comprises an aggregation service application 607, which is a utility application for creating and managing an aggregation group of headless computer entities. The human operator configures a master user application 606 on the master headless computer entity via the web administration interface 605 and web browser

604. Having configured the application 606 on the master computer entity, the aggregation service master application 607 keeps record of and applies those configuration settings across all slave headless computer entities 601, 602.

Each slave headless computer entity, 601, 602 is loaded with a same slave aggregation service application 608, 609 and a same slave user application 610, 611. Modifications to the configuration of the master user application 606 of the master computer entity are automatically propagated by the master aggregation service application 607 to all the slave user applications 610, 611 on the slave computer entities. The master aggregation service application on the master headless computer entity 600 automatically synchronizes all of its settings to all of the slave computer entities 601, 602.

Therefore, the high communication overhead of communicating application program data over the local area network is avoided, and therefore the cost of a high speed interface can be avoided. Rather than sending application program data over the local area network, configuration data to configure applications already resident on the slave computer entities is sent over the local are a network. From the users point of view, the group of headless computer entities acts like a single computing entity, but in reality, the group comprises individual member headless computer entities, each having its own processor, data storage, memory, and application, with synchronization and commonality of configuration settings between applications being applied by the aggregation service 607, 608, 609.

Figure 7:
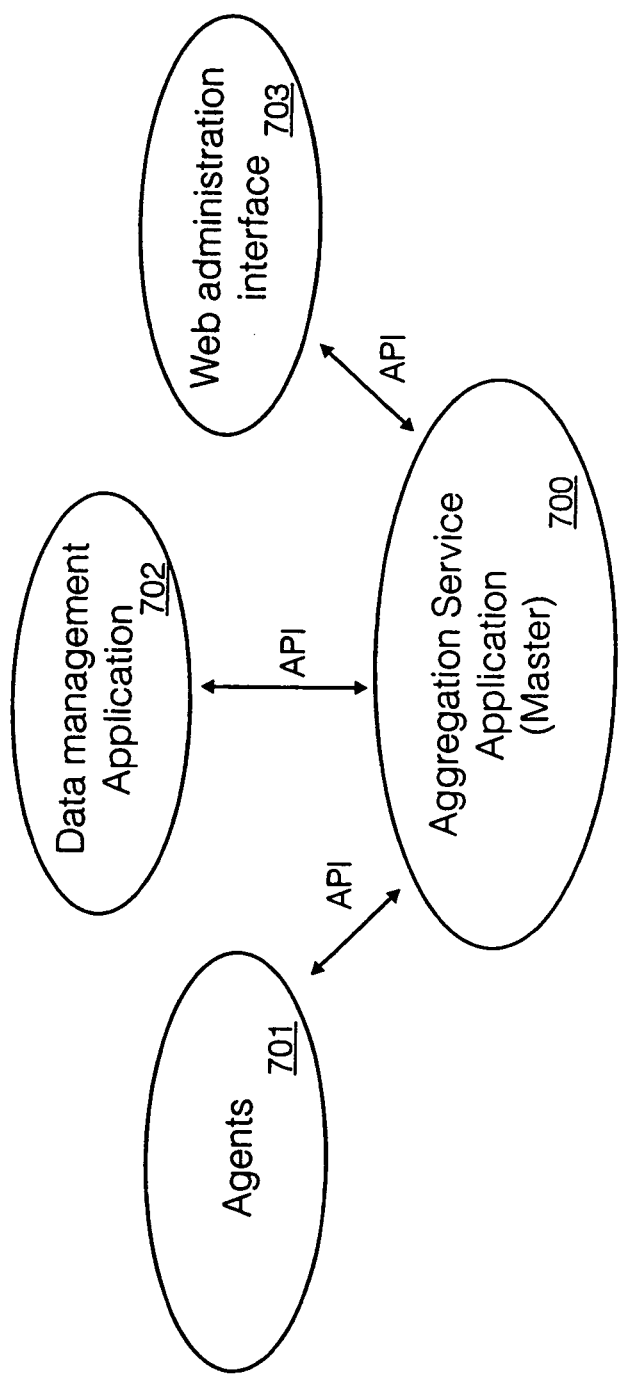
FIG. 7 illustrates schematically a logical layout of an aggregation service provided by an aggregation service application loaded on to the plurality of headless computer entities within a group.

Referring to FIG. 7 herein, there is illustrated logically an aggregation service provided by an aggregation service application 700, along with modes of usage of that service by one or more agents 701, data management application 702, and by a user via web administration interface 703. In each case, the aggregation service responds via a set of API calls, which interfaces with the operating system on the master headless computer entity. Operations are then propagated from the operating system on the master computer entity, to the operating systems on each of the slave headless computer entities, which, via the slave aggregation service applications 608, 609, make changes to the relevant applications on each of the slave computer entities.

Figure 8:
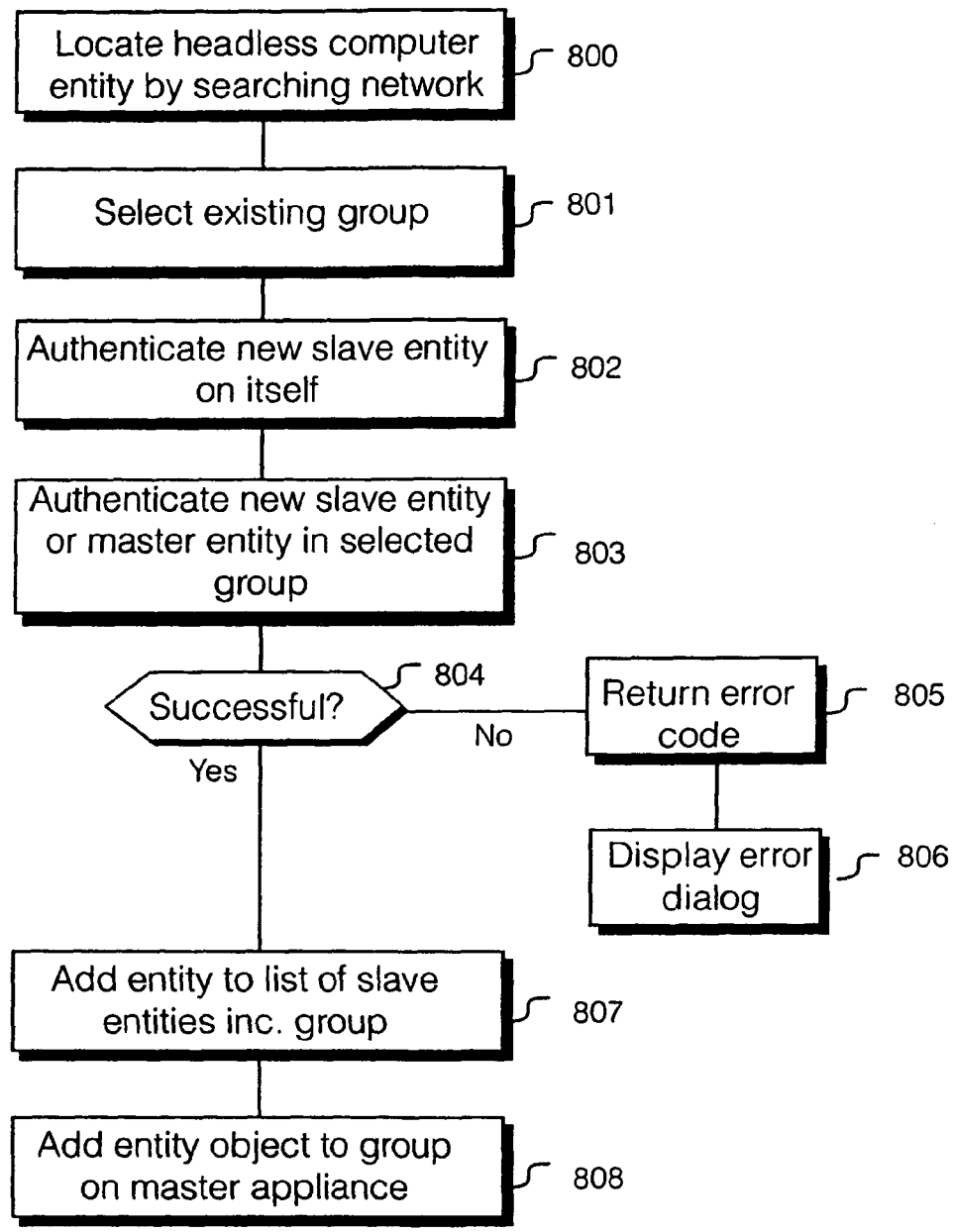
FIG. 8 illustrates schematically process steps carried out at a master headless computer entity for adding a slave computer entity to a group.

Referring to FIG. 8 herein, there is illustrated schematically process steps carried out by an aggregation service master application in conjunction with an operating system, at a master computer entity for adding a new slave computer entity to a group. In step 800, a user, from the headed console 207 selects a headless computer entity by searching the network for attached computer entities. Searching may be made via a prior art searching facility provided as part of the prior art operating system of the master computer entity, accessed through the web interface. In step 801, where the headless computer entity is to be added to an existing group, the user selects, via the conventional computer entity 207 and web interface of the master computer entity 600, an existing group to which the headless computer entity is to be added in the capacity of the slave. The master computer entity may manage several different groups simultaneously. Selection is achieved by selecting an existing group from a drop down menu displayed by the web administration interface 605. In step 802, the master computer entity sends configuration settings to the newly added slave computer entity, so that the slave computer entity can authenticate itself as being part of the group. Authentication by the slave computer entity comprises receiving data from the master computer entity describing which group the slave computer entity has been assigned to, and the slave computer entity storing that data within a database in the slave. In step 803, the master computer entity authenticates the new slave entity within the group listings stored at the master, by adding data describing the address of the slave entity, and describing operating system configuration settings and application configuration settings applied to the slave computer entity in a database listing stored at the master. In step 804, if addition of the slave computer entity to the group has not been successful, either because the addition to the group has not been authenticated on the slave or the master, then the aggregation service 607 API returns an error code to the web interface. The error code would typically arise due to a routine for making checks for adding the new slave computer entity to the group failing. In this case, in step 806, the master application 606 displays via the web admin interface 605 an error dialogue, readable at the headed computer entity 207, indicating that the addition to the group has failed. However if in step 804 the slave computer entity is successfully added to the group, then in step 807 the slave computer entity is added to the list of slave entities in the group, by adding an object describing the entity to the group in step 808.

Figure 9:
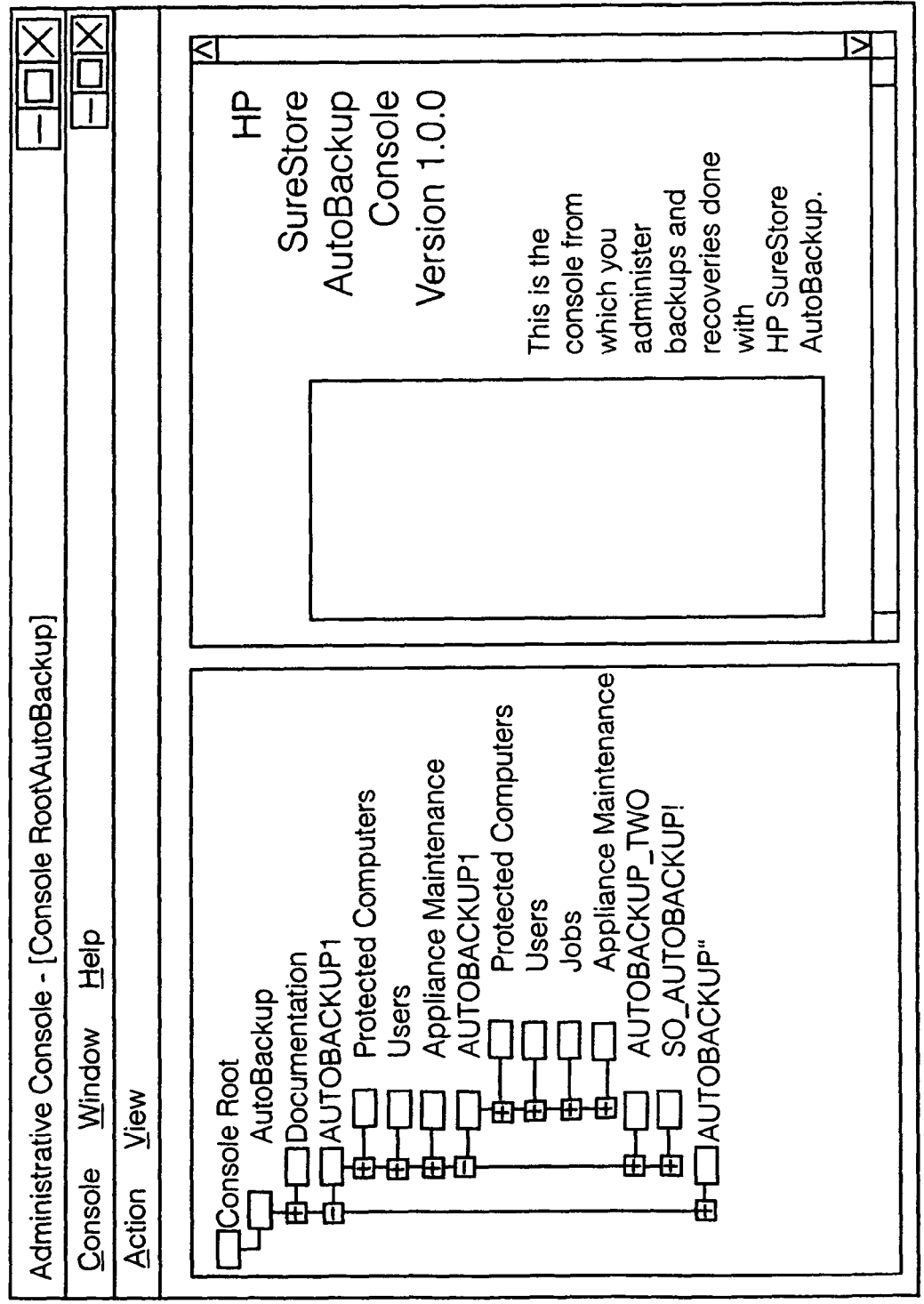
FIG. 9 illustrates schematically a user interface display at an administration console, for applying configuration settings to a plurality of headless computer entities at group level.

Referring to FIG. 9 herein, there is illustrated schematically a user interface displayed at the administrative console 207 via the web administration interface 605. The user interface may be implemented as a Microsoft Management Console (MMC) snap-in. The MMC interface is used to provide a single logical view of the computer entity group, and therefore allow application configuration changes at a group level. The MMC user interface is used to manage the master headless computer entity, which propagates changes to configuration settings amongst all slave computer entities. Interlocks and redirects ensure that configuration changes which affect a computer entity group apply to all headless computer entities within a group.

The user interface display illustrated in FIG. 9 shows a listing of a plurality of groups, in this case a first group Auto Back Up 1 comprising a first group of computer entities, and a second group Auto Back Up 2 comprising a second group of computer entities.

Within the first group Auto Back Up 1, objects representing individual slave computer entities appear in sub groups including a first sub group protected computers, a second sub group users, and a third sub group appliance maintenance.

Each separate group and sub group appears as a separate object within the listing of groups displayed.

An administrator implements adding of a slave computer entity to a group, by identifying an object representing the new slave computer entity to be added to a group or sub group, and dragging and dropping an object icon on to a group icon to which the computer entity is to be added. Programming of a drag and drop interface display and the underlying functionality is well understood by those skilled in the art.

Figure 10:
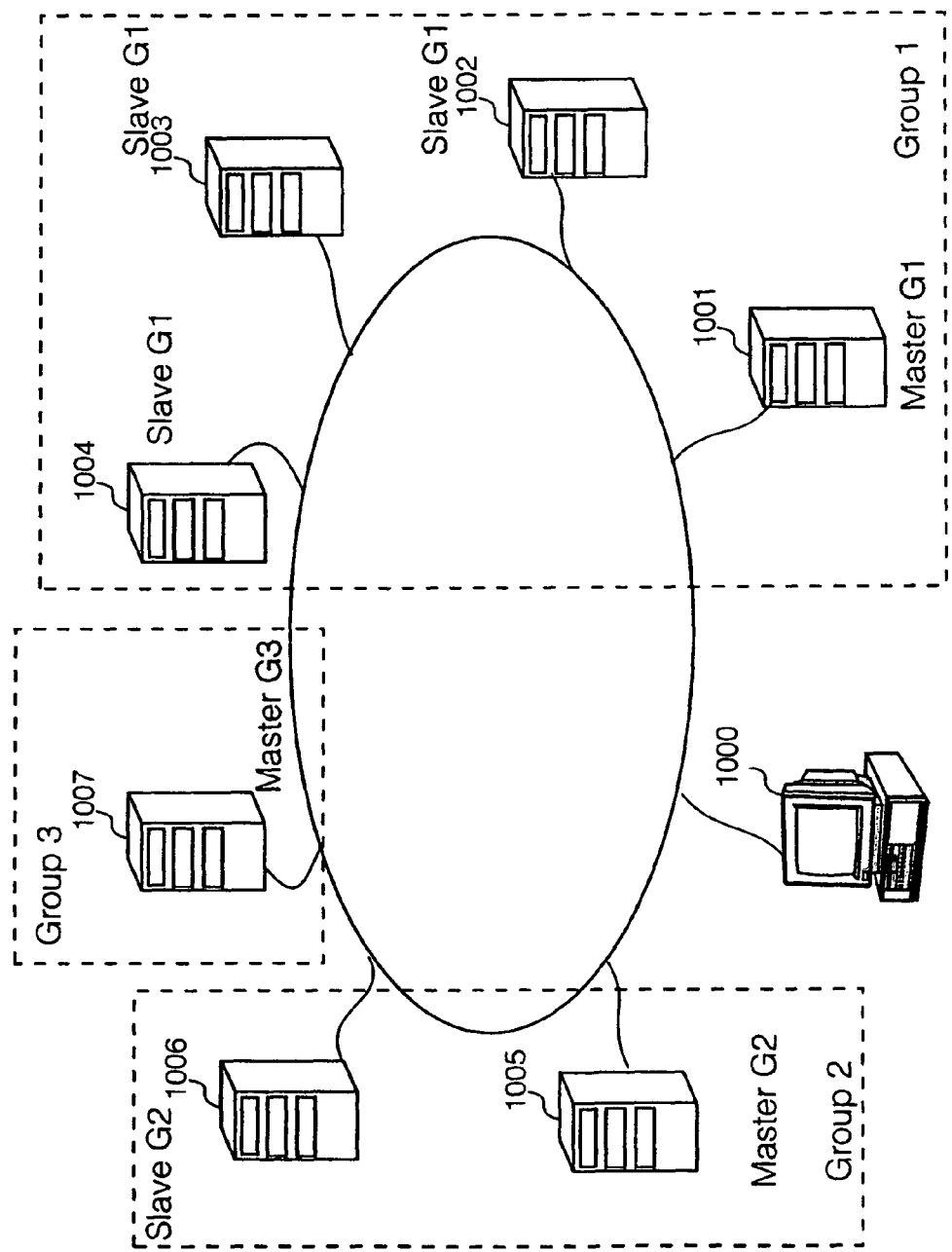
FIG. 10 illustrates schematically an example of different possible groupings of computer entities within a network environment.

Referring to FIG. 10 herein, there is illustrated schematically an arrangement of networked headless computer entities, together with an administrative console computer entity 1000. Within a network, several groups of computer entities each having a master computer entity, and optionally one or more slave computer entities can be created.

For example in the network of FIG. 10, a first group comprises a first master 1001, a slave 1002 and second slave 1003 and a third slave 1004. A second group comprises a second master 1005 and a fourth slave 1006. A third group comprises a third master 1007.

In the case of the first group, the first master computer entity 1001 configures the first to third slaves 1002-1004, together with the master computer entity 1001 itself to comprise the first group. The first master computer entity is responsible for setting all configuration settings and application settings within the group to be self consistent, thereby defining the first group. The management console computer entity 1000 can be used to search the network to find other computer entities to add to the group, or to remove computer entities from the first group.

Similarly, the second group comprises the second master computer entity 1005, and the fourth slave computer entity 1006. The second master computer entity is responsible for ensuring self consistency of configuration settings between the members of the second group, comprising the second master computer entity 1005 and the fourth slave computer entity 1006.

The third group, comprising a third master entity 1007 alone, is also self defining. In the case of a group comprising one computer entity only, the computer entity is defined as a master computer entity, although no slaves exist. However, slaves can be later added to the group, in which case the master computer entity ensures that the configuration settings of any slaves added to the group are self consistent with each other.

In the simple case of FIG. 10, three individual groups each comprise three individual sets of computer entities, with no overlaps between groups. In the best mode herein, a single computer entity belongs only to one group, since the advantage of using the data processing and data storage capacity of a single computer entity is optimized by allocating the whole of that data processing capacity and data storage capacity to a single group. However, in other specific implementations and in general, a single computer entity may serve in two separate groups, to improve efficiency of capacity usage of the computer entity, provided that there is no conflict in the requirements made by each group in terms of application configuration settings, or operating system configuration settings.

For example in a first group, a slave entity may serve in the capacity of a network attached storage device. This entails setting configuration settings for a storage application resident on the slave computer entity to be controlled and regulated by a master computer entity mastering that group. However, the same slave computer entity may serve in a second group for a different application, for example a graphics processing application, controlled by a second master computer entity, where the settings of the graphics processing application are set by the second master computer entity.

In each group, the first appliance to use to create the group is designated as the "master", and then "slave" computer entities are added to the group. The master entity in the group is used to store the group level configuration settings for the group, which the other slave computer entities synchronize themselves in order to be in the group.

Figure 11:
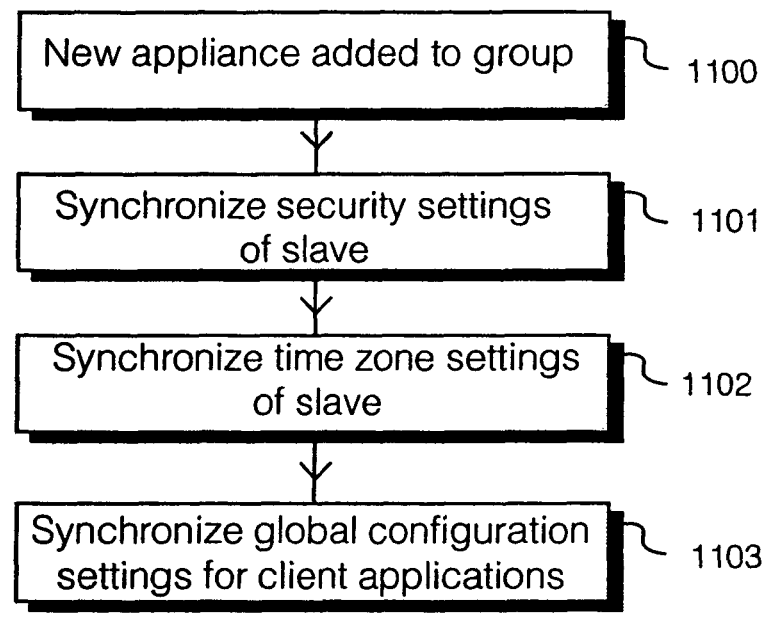
FIG. 11 illustrates schematically process steps carried out by an aggregation service application when a new headless computer entity is successfully added to a group.

Referring to FIG. 11 herein, there is illustrated schematically actions taken by the aggregation service master application 607 when a new computer entity is successfully added to a group. The aggregation service master application 607 resident on the master computer entity 600 automatically synchronizes the security settings of each computer entity in the group in step 1101. This is achieved by sending a common set of security settings across the network, addressed to each slave computer entity within the group. When each slave computer entity receives those security settings, each slave computer entity self applies those security settings to itself. In step 1102, the aggregation service 607 synchronizes a set of time zone settings for the new appliance added to the group. Time zone settings will already exist on the master computer entity 600, (and on existing slave computer entities in the group). The time zone settings are sent to the new computer entity added to the group, which then applies those time zone settings on the slave aggregation service application in that slave computer entity, bringing the time zone settings of the newly added computer entity in line with those computer entities of the rest of the group. In step 1103, any global configuration settings for a common application in the group are sent to the client application on the newly added computer entity in the group. The newly added computer entity applies those global application configuration settings to the slave user application running on that slave computer entity, bringing the settings of that slave user application, into line with the configuration settings of the server application and any other client applications within the rest of the group.

Figure 12:
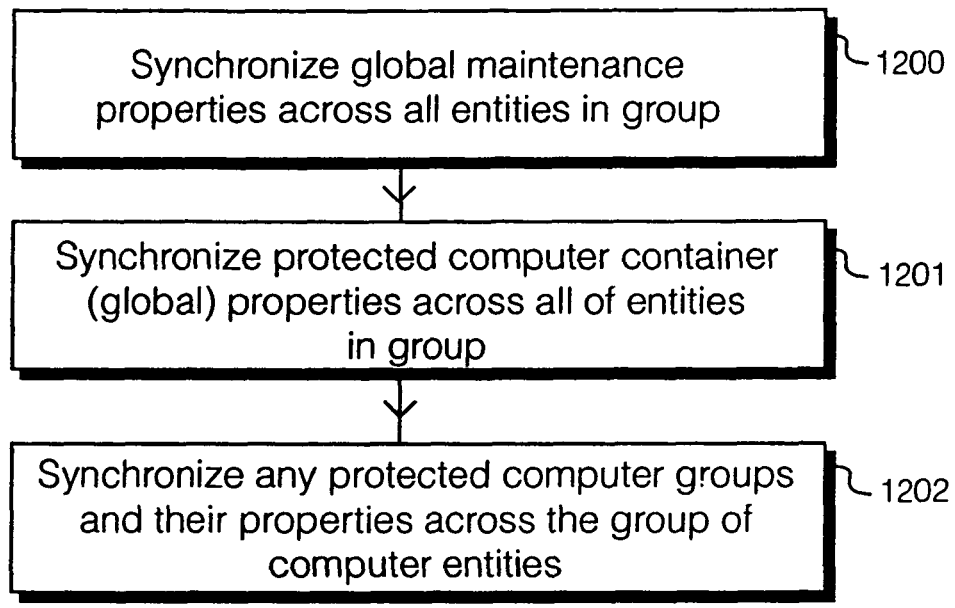
FIG. 12 illustrates schematically process steps carried out by a master application when a computer entity group is created.

Referring to FIG. 12 herein, there is illustrated schematically actions taken by the master application 606 when a computer entity group is created. The actions are taken when a new computer entity group is created, by the user application 605, 610, 611, which the group serves. The relevant commands need to be written into the user application, in order that the user application will run on the group of headless computer entities.

The master computer entity provides settings to the aggregation service 607, as the data management application configuration settings that will then be synchronized across all computer entities in the group.

In step 1200, a first type of data management application configuration setting comprising global maintenance properties, is synchronized across all computer entities in the group. The global maintenance properties includes properties such as scheduled back up job throttling; and appliance maintenance job schedules. These are applied across all computer entities in the group by the aggregation service applications 607, with the data being input from the master management application 606.

In step 1201, a second type of data management application configuration settings comprising protected computer container properties, are synchronized across all computer entities in the group. The protected computer container properties include items such as schedules; retention; excludes; rights; limits and quotas; log critical files; and data file definitions. Again, this is effected by the master management application 606 supplying the protected computer container properties to the aggregation service 607, which then distributes them to the computer entities within the group, which then self apply those settings to themselves.

In step 1202, a third type of data management application configuration settings, are applied such that any protected computer groups and their properties are synchronized across the group. The properties synchronized to the protected computer groups includes schedule; retention; excludes; rights; limits and quotas; log critical files, and data file definitions applicable to protected computer groups. Again, this is effected by the master management application 606 applying those properties through the aggregation service 607 which sends data describing those properties to each of the computer entities within the group, which then self apply those properties to themselves.

An advantage of the above implementation is that it is quick and easy to add a new computer entity into a group of computer entities. The only synchronization between computer entities required is of group level configuration settings. There is no need for a distributed database merge operation, and there is no need to merge a new computer entities file systems into a distributed network file system shared across all computer entities.

Error checking is performed to ensure that a newly added computer entity can synchronize to the group level configuration settings.

Figure 13:
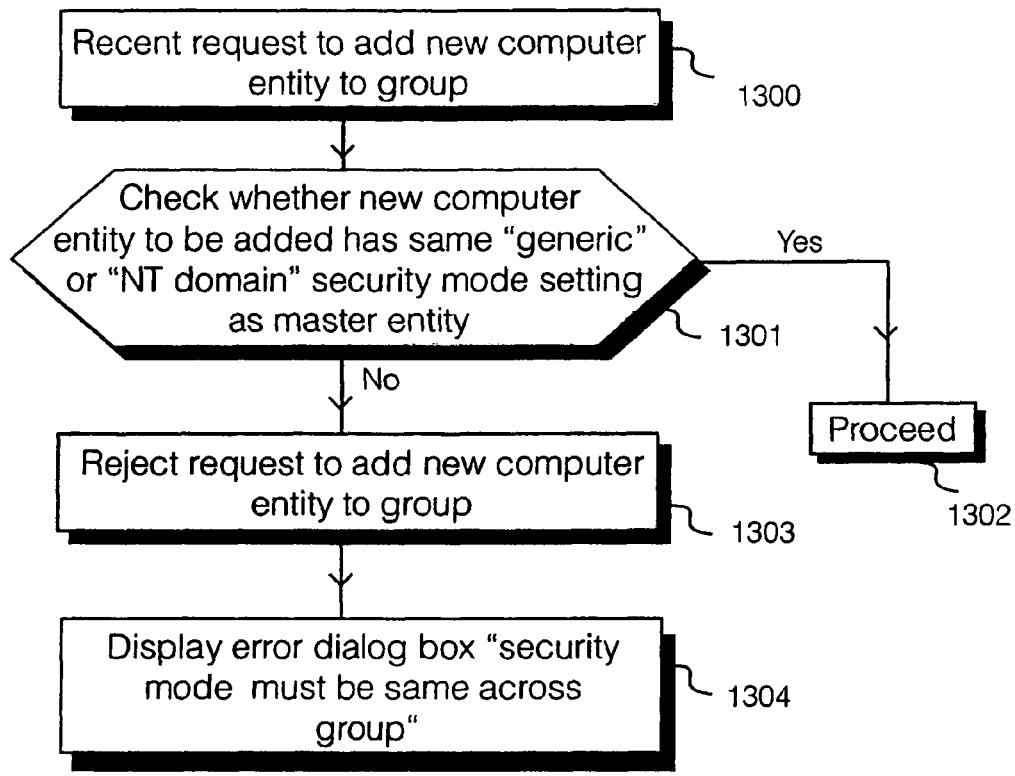
FIG. 13 illustrates schematically process steps carried out by a "add to computer entity group" API on adding a new computer entity to a group.

Referring to FIG. 13 herein, there is illustrated schematically process steps carried out by an API for adding to a group.

In step 1300 the add to group API receives a request to add a new computer entity to an existing group, the request being generated from the data management application 606, in response to the request via the web interface, input through the administration console. Before adding a new computer entity to a group, the aggregation service application 607 checks, in step 1301 whether the new slave computer entity to be added to the group has a same generic, or "NT Domain" security mode setting as the first computer entity (the master computer entity) in the group. If the slave computer entity does not have the same generic or "NT Domain" security mode setting as the master computer entity, then the request to add the new slave computer entity to the group is rejected in step 1303, and in step 1304 an error message is generated alerting the user via the web interface/or LCD that the security mode must be the same across the whole of the group. However, if the generic or "NT Domain" security mode settings between the master computer entity and slave computer entity are found to be the same in step 1301 then in step 1302, the addition of the new slave computer entity to the group proceeds.

Figure 14:
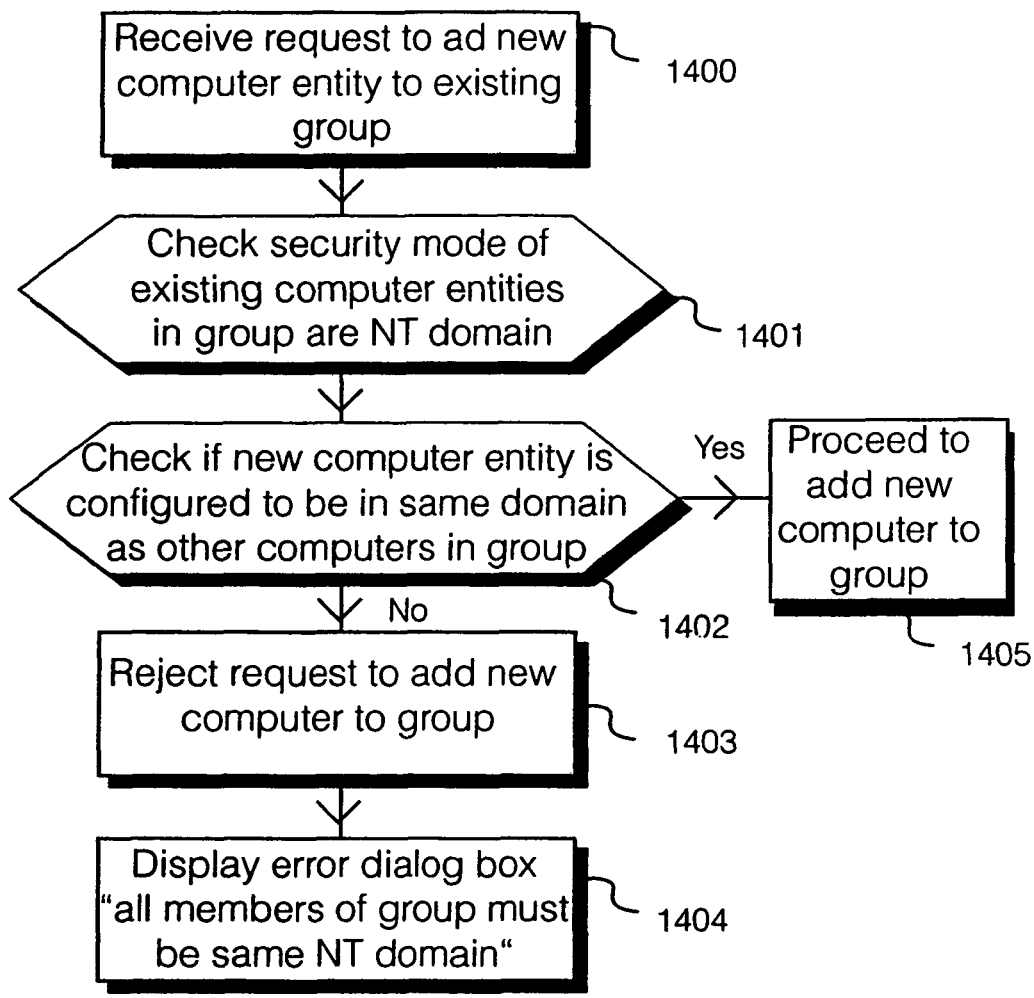
FIG. 14 illustrates a second check process carried out by an "add to computer entity group" API when adding a new computer entity to a group.

Referring to FIG. 14, there is illustrated schematically processes carried out by the add to group API when a new computer entity is to be added to an existing group, and the existing computer entities in that group are using an NT domain security mode. In step 1400, the API receives the request to add a new computer entity to the existing group and in step 1401 the aggregation service application checks the security mode of existing computer entities in the group, to make sure that they are NT domain. Where this is the case, then in step 1402 the aggregation service application checks whether the new computer entity is configured to be in the same domain as the other computers in the group. If not, then in step 1403 the aggregation service application rejects the request to add the new computer entities to the group, and in step 1404 displays an error dialogue box via the web interface and/or LCD, alerting an administrator that all members in the group must be in the same NT domain. If in step 1402 the new computer entity is configured to be in the same NT domain security mode as the other computers in the group, then in step 1405 the new computer entity can proceed to be added to the group.

Figure 15:
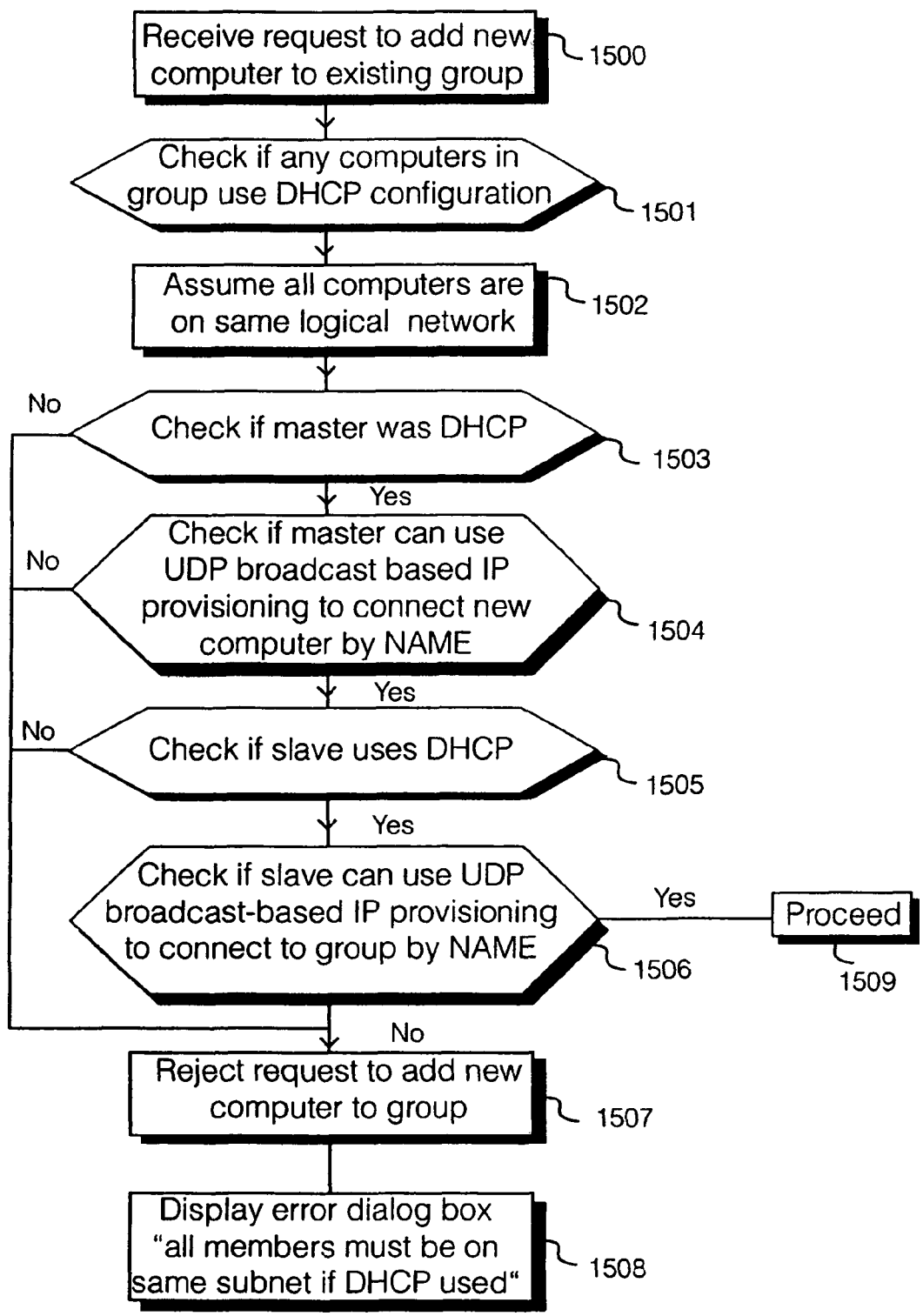
FIG. 15 illustrates schematically a third check process carried out by an "add to computer entity group" API for adding a new computer entity to an existing group.

Referring to FIG. 15 herein, there is illustrated schematically processes carried out by the aggregation service application 607 for adding a new computer entity to an existing group of computer entities. In step 1500, a request to add a new computer entity to an existing group is received from a management application 606 as herein before described. In step 1501 the aggregation service application checks if any computers in the group use DHCP configuration. Having established that all existing computers in the group do use DHCP configuration, there is applied the basic assumption that all computers are on a same logical network, that is to say there are no routers between different computer entities in the same group. In step 1503 it is checked whether the master computer entity is using DHCP configuration. If so, then in step 1504, it is checked whether the master computer entity can use the UDP broadcast based IP provisioning to connect to the new computer entity by name. If in step 1505 it is checked whether the slave computer entity uses DHCP configuration and if so, then in step 1506 it is checked that the slave computer entity can use UDP broadcast based IP provisioning to connect to the master computer entity by name. If any of these connectivity checks fail, then in step 1507 the request to add a new computer entity to the group is rejected and in step 1508 an error warning message is displayed in the web interface and/or LCD display that all members of the group must be on the same sub-net if DHCP configuration is used.

If a data management application 606 is to find out what a current computer entity group configuration is, then it can use a read appliance group structure API on any computer entity within the group. The possible responses from the computer entity interrogated include:

If the API is run on a stand alone computer entity, then it returns an error indicating disk;

If the API is run on a master computer entity, then it returns details of computer entity group members, including computer entity names, IP addresses and which computer entity is a master computer entity;

If the API is run on a slave computer entity, then the slave computer entity will contact the master computer entity to obtain group structure information. It then returns the details of the computer entity group members (computer entity names, IP addresses, which computer entity is master). If the master computer entity is off-line then the slave computer entity will return an error indicating that it cannot obtain a group structure information.

This API can be used to display computer entity group structures in the data management application administration interface, for example in the MMC snap-in.

To create a group of computer entities, then a data management application 606 can call a create appliance group API on a stand alone computer entity. This allows an administrator to create a new computer entity group with a selected computer entity as the master computer entity.

For removal of a computer entity from an aggregated group, there are provided a set of API's available through the aggregation service application 607-609, which can either remove individual computer entities from a computer entity group, or ungroup an entire computer entity group.

To completely remove an appliance from a group, then a data management application can call an ungroup appliance group API on a master computer entity. If this is done, then all of the computer entities in the group will be automatically converted to stand alone devices. This effectively removes all the computer entities from the computer entity group, but as stand alone computer entities they will keep all of their current configuration settings and all of their data management application accounts are unaffected. This will simply mean that any future configuration change will only affect that stand alone computer entity.

Once a "slave" computer entity is part of an aggregated group, then a remove from appliance group API on the master computer entity of that group can be used to remove that slave computer entity from the group. When a computer entity is removed, then it simply becomes a stand alone computer entity again, but keeps it current configuration settings and data management application accounts retained from when it was part of a group. If a selected slave computer entity is not available when an administrator uses a remove from appliance group API, then an error indicates to the data management application that the selected computer entity must be on-line for it to be successfully removed from the group and converted to a stand alone computer entity. However, this API must also include an unconditional remove option that allows the selected slave computer entity to be removed from the group even if it is not on-line. This has the effect of removing a selected computer entity from a group member list held on the master computer entity.

A master computer entity can be removed from an aggregated group using an ungroup appliance group API which converts all of the computer entities in a group to be stand alone devices.

If a master computer entity is off-line, then it is not possible to use a remove from appliance group API with the unconditional remove option, to remove a computer entity from a group when the master computer entity is off-line. Therefore, a software wizard is provided in the web administration interface applicable to both master computer entities and slave computer entities which allows an administrator to unconditionally convert a computer entity into a stand alone mode. This functionality is not visible on individual stand alone computer entities. When this option is used on a slave computer entity, the software wizard should first attempt a normal remove from group operation, and if this fails, for example due to the master being off-line, then unconditionally convert into a stand alone computer entity anyway. When this option is used on a master computer entity, the software wizard first attempts a normal ungroup appliance group operation, and if this fails, for example due to one or more slaves being off-line, then unconditionally convert into a stand alone computer entity anyway.

Synchronization of security configuration changes are made as follows:

Given that computer entity security settings must be the same across all computer entities in a group, when a change is made to a security configuration, for example in NT domain mode if a new NT user or group is added to an authorized users list, on one computer entity, this change is automatically made to all other computer entities in the same group.

One method for achieving this is to perform a security configuration change on the master computer entity and then the master synchronizes the security configuration settings to all the slave computer entities. When the master computer entity pulls the slave computer entities to check if they are in synchronization with a set of master group level settings, it will find that the slave computer entity is out-of-date and therefore updates it's group level settings which include the security settings. This assures that all the slave computer entities security settings are updated to match the master computer entity even if the slave computer entity was off-line when the security settings change was made. If the administrator starts a security wizard software from one of the slave computer entity web interfaces, then the administrator will be automatically redirected to the web administration interface of the master computer entity, and so the administrator will continue with the security wizard from this master computer entity. At the end of the security wizard, the administrator is automatically redirected back to a slave computer entity web administration interface. If the master computer entity is off-line, then an error message is displayed when the user attempts to run the security wizard from the slave computer entity.

When in an NT domain mode, the NT domain is the same across the whole group. This makes it difficult to change the NT domain once the group has been created, since it would mean manually adding all the slave computer entities into the domain and rebooting the entire group. Consequently, the ability to change the NT domain is disabled on the master computer entity when it is part of a computer entity group. The only way the administrator can change the NT domain across the computer entity group would be to ungroup the group and then manually change the NT domain on each of the stand alone appliances that make up the group, then recreate the group again.

An exception to disabling the ability to change the NT domain occurs in the case of lost NT domain settings during a software reset. In this case, on the master computer entity the administrator is able to reconfigure the NT domain by using the security wizard. In this case, on a slave computer entity, if the administrator runs the security wizard, then it does not redirect to the master computer entity, but instead allows the administrator to reconfigure the NT domain and nothing else.

If the administrator performs an emergency reset, by pressing the power on/off button four times or a predetermined number of times, on a slave computer entity in a generic security mode, then an installation utility on the slave computer entity must skip the step that allows the administrator to change the administrator user name and password. This is only changeable via the emergency reset on the master computer entity.

Network configuration changes between different computer entities in the group are synchronized as follows:

Given that the master computer entity holds a list of slave computer entity network addresses and names and the slave computer entities hold the master computer entity network address and name, then when a change is made to a network configuration on a computer entity, then this change must be automatically made in the other computer entities in the same group that are effected by that change.

If an administrator runs a "network" wizard on a slave computer entity, to change network configuration settings, then these changes can only be accepted if the master computer entity can be contacted to update it's own stored list of slave computer entity network addresses and names. If the master computer entity is off-line for any reason, then the wizard displays an error message identifying that the named master computer entity must be on-line in order to change a network configuration.

If an administrator runs the network wizard on the master computer entity, then these changes can be accepted even if none of the slave computer entities are on-line at the time, because the slave computer entities will be automatically updated to the new configuration settings by the master computer entity synchronization process.

If an administrator performs an emergency reset operation by pressing the power on/off button four times, and then changes a network configuration using a computer entity installation utility, then if the computer entity is part of a group, then various additional checks must be made before any changes to the network configurations are accepted. These include the following:

Firstly, if the changes are made at a slave computer entity, then these changes can only be accepted if the master computer entity can be contacted to update it's list of slave computer entity network addresses and names. If the master computer entity is off-line then there is displayed an error message identifying that the named master computer entity must be on-line in order to change the network configuration. This error message dialogue also gives the administrator the option to unconditionally remove a slave computer entity from the group incase the master has permanently failed.

If the change is made at a master computer entity, then the changes can be accepted even if none of the slave computer entities are on-line, since the slave computer entities will be automatically updated to the new settings via the master computer entity synchronization process.

If the change was to switch from static IP to DHCP addressing modes, then the computer entity must check it can use the UDP broadcast based IP provisioning to connect to all the computer entities in the group by name. A list of the names of the appliances can be obtained from the master computer entity by any of the slaves in the group. If this connectivity check fails, then there is displayed an error dialogue explaining that all the computer entities must be on the same sub-net if DHCP is being used, and the configuration change is accepted.

The invention claimed is:

1. A method of operating a computer network which includes
    (a) a management console having user inputs and a processor including an operating system and a network connection for communicating with a computer entity of the network;
    (b) a master headless computer entity coupled via the network to be responsive to commands from the management console resulting from the user inputs to manage several different groups simultaneously;
    (c) at least one slave headless computer entity in each of the several different groups, the at least one slave headless computer entity coupled to be responsive to commands from the master headless computer entity; and
    (d) the master headless computer entity and the at least one slave headless computer entity being formed in a group, the method comprising:
        changing the configuration of the master headless computer entity in response to inputs to the management console;
        propagating to all slave headless computer entities of the group the changes to the master headless computer entity;
        coupling the master headless computer entity and the at least one slave headless computer entity of the group to each other and the master headless computer entity to the management console so that all computer entities of the group appear to computer entities of the network outside the group as a single computer entity having same functionality as functionality of the master headless computer entity, wherein the master headless computer entity includes a utility application and a user application, and each of the slave headless computer entities includes a utility application and a user application respectively; and
        synchronizing utility and user applications of the each of the slave headless computer entities with the utility and user applications of the master headless computer entity, wherein synchronizing the utility and user application of each of the slave headless computer entities with the utility and user applications of the master headless computer entity includes synchronizing properties to protected computer groups through an aggregation service which sends data describing the properties to each of the slave headless computer entities within the group, and each the slave headless computer entities then self apply the properties, and wherein the properties synchronized to the protected computer groups include at least one of schedule, retention, excludes, rights, limits and quotas, log critical files, and data file definitions applicable to the protected computer groups.

2. The method of claim 1, further comprising:
    causing a master computer entity utility application coupled with the management console and utility applications of the computer entities of the group to (a) create and manage the headless computer entities of the group, including the master headless computer entity, in response to commands from the management console; and (b) configuring a master user application of the master headless computer entity.

3. The method of claim 1, further comprising:
    causing the master headless computer entity to apply at least one configuration setting to a slave headless computer entity candidate of the group;
    setting said slave headless computer entity candidate to have an equivalent functionality to a user as a first computer entity, each of headless computer entities of the group having operating characteristics;
    causing the master headless computer entity to (a) check, via the network, as to whether said slave headless computer entity candidate has at least one of the same operating characteristics as the first computer entity, and (b) prevent said slave headless computer entity candidate from being a member of the group if said slave headless computer entity candidate does not have the same operating characteristics as a predetermined one of the operating characteristics of the master headless computer entity.

4. The method of claim 3, whereto the operating characteristics include at least an NT domain.

5. The method of claim 3, wherein the operating characteristics include at least a sub-net when DHCP configuration is used.

6. The method of claim 2, wherein synchronizing the utility and user application of the slave headless computer entities with the utility and user applications of the master headless computer entity includes at least synchronizing all configuration settings of the applications.

7. The method of claim 2, wherein synchronizing the utility and user application of the slave headless computer entities with the utility and user applications of the master headless computer entity includes at least synchronizing group level configuration settings in order to be in the group.

8. The method of claim 2, wherein synchronizing the utility and user application of the slave headless computer entities with the utility and user applications of the master headless computer entity includes synchronizing at least security settings in order to be in the group.

9. The method of claim 2, wherein synchronizing the utility and user application of the slave computer entities with the utility and user applications of the master headless computer entity includes synchronizing at least management application configuration setting comprising global maintenance properties.

10. The method of claim 2, wherein synchronizing the utility and user application of the slave headless computer entities with the utility and user applications of the master headless computer entity includes synchronizing at least data management application configuration setting comprising protected computer container properties.

11. A system comprising:
    a master headless computer entity coupled via a computer network to be responsive to command to manage several different groups simultaneously;
    at least one slave headless computer entity in each of the several different groups, the at least one slave headless computer entity coupled to be responsive to commands from the master headless computer entity, the master headless computer entity and the at least one slave headless computer entity being formed in a group; and
    a management console having console having user inputs and a processor including an operating system and a network connection for communicating with computer entities of the computer network, the management console is configured to:

change configuration of the master headless computer entity in response to inputs to the management console;

propagate to all slave headless computer entities of the group the change to the master headless computer entity;

couple the master headless computer entity and the at least one slave headless computer entity of the group to each other and the master headless computer entity to the management console so that all computer entities of the group appear to computer entities of the network outside the group as a single computer entity having same functionality as functionality of the master headless computer entity, wherein the master headless computer entity includes a utility application and a user application, and each of the slave headless computer entities includes a utility application and a user application respectively; and synchronize utility and user applications of the each of the slave headless computer entities with the utility and user applications of the master headless computer entity, wherein synchronize the utility and user application of each of the slave headless computer entities with the utility and user applications of the master headless computer entity includes synchronize properties to protected computer groups through an aggregation service which sends data describing the properties to each of the slave headless computer entities within the group, and each the slave headless computer entities then self apply the properties, and wherein the properties synchronized to the protected computer groups include at least one of schedule, retention, excludes, rights, limits and quotas, log critical files, and data file definitions applicable to the protected computer groups.

12. A non-transient computer readable medium storing instructions executable by a processor to:

operate a computer network which includes:

a management console having user inputs and a processor including an operating system and a network connection for communicating with a computer entity of the network;

a master headless computer entity coupled via the network to be responsive to commands from the management console resulting from the user inputs to manage several different groups simultaneously;

at least one slave headless computer entity in each of the several different groups, the at least one slave headless computer entity coupled to be responsive to commands from the master headless computer entity; and the master headless computer and the at least one slave headless computer entity being formed in a group;

change configuration of a master headless computer entity in response to inputs to a management console;

propagate to all slave headless computer entities of a group all changes to the master headless computer entity;

couple the master headless computer entities and at least one of the slave headless computer entities of the group to each other and the master headless computer entity to the management console so that all computer entities of the group appeal to computer entities of the network outside the group as a single computer entity having same functionality as functionality of the master headless computer entity, wherein the master headless computer entity includes a utility application and a user application, and each of the slave headless computer entities includes a utility application and a user application respectively; and synchronize utility and user applications of the each of the slave headless computer entities with the utility and user applications of the master headless computer entity, wherein synchronize the utility and user application of each of the slave headless computer entities with the utility and user applications of the master headless computer entity includes synchronize properties to protected computer groups through an aggregation service which sends data describing the properties to each of the slave headless computer entities within the group, and each the slave headless computer entities then self apply the properties, and wherein the properties synchronized to the protected computer groups include at least one of schedule, retention, excludes, rights, limits and quotas, log critical files, and data file definitions applicable to the protected computer groups.

* * * * *

UNITED STATES PATENT AND TRADEMARK OFFICE
CERTIFICATE OF CORRECTION

PATENT NO. : 8,769,478 B2
APPLICATION NO. : 11/111866
DATED : July 1, 2014
INVENTOR(S) : Stephen Gold et al.

It is certified that error appears in the above-identified patent and that said Letters Patent is hereby corrected as shown below:

In the Claims:

In column 16, line 10, in Claim 3, after "characteristics;" insert -- and --.

In column 16, line 21, in Claim 4, delete "whereto" and insert -- wherein --, therefor.

In column 16, line 27, in Claim 6, delete "application" and insert -- applications --, therefor.

In column 16, line 32, in Claim 7, delete "application" and insert -- applications --, therefor.

In column 16, line 37, in Claim 8, delete "application" and insert -- applications --, therefor.

In column 16, line 42, in Claim 9, delete "application" and insert -- applications --, therefor.

In column 16, line 44, in Claim 9, after "least" insert -- data --.

In column 16, line 45, in Claim 9, delete "setting" and insert -- settings --, therefor.

In column 16, line 48, in Claim 10, delete "application" and insert -- applications --, therefor.

In column 16, line 55, in Claim 11, delete "command" and insert -- commands --, therefor.

In column 16, line 63, in Claim 11, after "having" delete "console having".

In column 18, line 7, in Claim 12, after "computer" insert -- entity --.

In column 18, line 15, in Claim 12, delete "entities" and insert -- entity --, therefor.

In column 18, line 19, in Claim 12, delete "appeal" and insert -- appear --, therefor.

Signed and Sealed this
Seventh Day of October, 2014

Michelle K. Lee
*Deputy Director of the United States Patent and Trademark Office*